United States Patent Office 3,641,127
Patented Feb. 8, 1972

---

3,641,127
(3-BENZOYLPHENYL) ALKANOIC ACIDS
Daniel Farge, Val-de-Marne, Mayer Naoum Messer, Essonne, and Claude Moutonnier, Paris, France, assignors to Rhone-Poulenc S.A., Paris, France
No Drawing. Filed Jan. 25, 1968, Ser. No. 700,375
Claims priority, application France, Jan. 27, 1967, 92,828
Int. Cl. C07c 65/20, 149/40
U.S. Cl. 260—516                    7 Claims

ABSTRACT OF THE DISCLOSURE (3-benzoylphenyl)alkanoic acids of the formula:

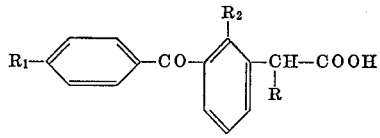

wherein R represents a hydrogen atom or an alkyl group containing 1 to 4 carbon atoms, $R_1$ represents a hydrogen atom or an alkylthio group containing 1 to 4 carbon atoms, and $R_2$ represents a hydrogen atom or a hydroxy or methoxy group, and salts thereof, for example 3-benzoylphenylacetic acid, have been found to possess pharmacodynamic properties and are especially useful as anti-inflammation agents.

---

This invention relates to new therapeutically useful (3-benzoylphenyl)alkanoic acids, to processes for their preparation and pharmaceutical compositions containing them.

According to the present invention, there are provided the new (3-benzoylphenyl)alkanoic acids of the general formula:

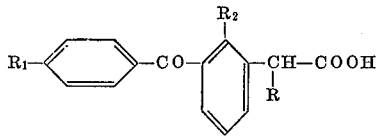

wherein R represents a hydrogen atom or an alkyl group containing 1 to 4 carbon atoms, $R_1$ represents a hydrogen atom or an alkylthio group containing 1 to 4 carbon atoms, and $R_2$ represents a hydrogen atom or a hydroxy or methoxy group, and salts thereof, for example alkali metal, alkaline earth metal, ammonium and amine salts. Compounds of the aforesaid formula in which R represents an alkyl group can exist in optically active forms; the present invention includes the optically active isomers of such compounds and racemates thereof.

According to a feature of the invention, the (3-benzoylphenyl)-alkanoic acids of Formula I, wherein R represents an alkyl group, are prepared by the process which comprises hydrolyzing and decarboxylating a 3-benzoylphenylacetic acid derivative of the general formula:

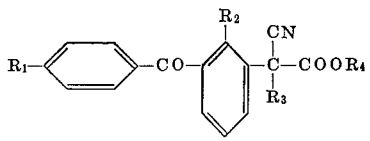

wherein $R_3$ and $R_4$ are the same or different and each represents an alkyl group containing 1 to 4 carbon atoms, and $R_1$ and $R_2$ are as hereinbefore defined, by methods known per se for the hydrolysis and decarboxylation of cyanoacetic acid esters. The process is preferably carried out by heating the starting material of Formula II in water or an organic solvent, for example ethanol, in the presence of a base, such as potassium or sodium hydroxide, or an acid such as sulphuric acid. Advantageously, it is effected in an inert atmosphere, such as a nitrogen atmosphere. When $R_2$ is a methoxy group, the group may be hydrolyzed contingently to the hydroxy group according to the conditions employed.

3-benzoylphenylacetic acid derivatives of Formula II can be obtained by alkylation of a cyanoacetic acid derivative of the general formula:

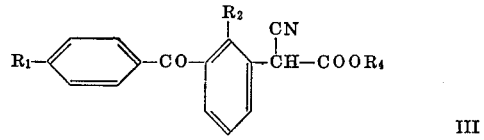

wherein the various symbols are as hereinbefore defined, by reaction with a reactive ester of the formula $R_3$—X, wherein $R_3$ is as hereinbefore defined and X represents the acid residue of a reactive ester, for example a halogen atom, in the presence of an alkaline condensing agent such as sodium or potassium ethoxide. It is advantageous to prepare initially an alkali metal derivative of the cyanoacetic acid derivative of Formula III and then to react the alkali metal derivative with the reactive ester of formula $R_3$—X, operating in a solvent such as ethanol at the boiling temperature of the solvent.

The cyanoacetic acid derivatives of Formula III can be obtained from 3-benzoylphenylacetonitrile derivatives of the general formula:

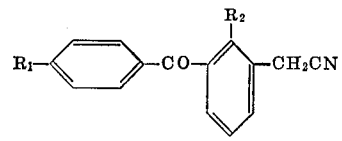

wherein $R_1$ and $R_2$ are as hereinbefore defined, by methods known per se for carbalkoxylating nitriles containing an active hydrogen atom. The reaction is preferably carried out using an alkyl carbonate of the formula $R_4$—O—CO—O—$R_4$, wherein $R_4$ is as hereinbefore defined, in the presence of an alkaline condensing agent such as sodium ethoxide or sodamide.

3-benzoylphenylacetonitrile derivatives of Formula IV can be obtained from 3-halomethylbenzophenones of the general formula:

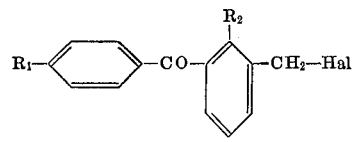

wherein $R_1$ and $R_2$ are as hereinbefore defined and Hal represents a halogen (preferably bromine) atom, by methods known per se for converting a halogenated derivative to the corresponding nitrile. The reaction is preferably carried out using an alkali metal cyanide in an aqueous organic medium and at the reflux temperature of the mixture.

3-halomethylbenzophenones of Formula V can be obtained from 3-methylbenzophenones of the general formula:

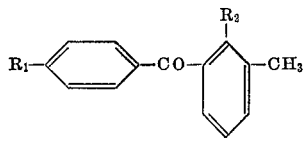

wherein $R_1$ and $R_2$ are as hereinbefore defined, by methods known per se for halogenating the side chains of aromatic derivatives. It is particularly advantageous to employ bromine and to operate in an organic solvent such as ethylene bromide at the reflux temperature of the mixture and in the presence of ultra-violet light.

The (3-benzoylphenyl)alkanoic acids of general Formula I, wherein R represents a hydrogen atom, are prepared, according to a further feature of the invention, by hydrolyzing a corresponding 3-benzoylphenylacetonitrile derivative of general Formula IV by methods known per se for converting a nitrile to the corresponding acid. The hydrolysis is advantageously carried out by heating the acetonitrile derivative of Formula IV in water or an organic solvent, for example ethanol, in the presence of a base, such as sodium or potassium hydroxide, or an acid such as sulphuric acid. Advantageously, it is effected in an inert atmosphere such as a nitrogen atmosphere. When there is a methoxy group ($R_2$) in the 2-position of the benzene ring, the group may be hydrolyzed contingently to the hydroxy group according to the conditions employed.

The D- and L-isomers of the (3-benzoylphenyl)alkanoic acids of general Formula I, wherein R represents an alkyl group, and $R_1$ and $R_2$ represent hydrogen atoms, and also the corresponding racemic compounds, are obtained, according to another feature of the invention, by oxidation of a corresponding (3-benzylphenyl)alkanoic acid of the general formula:

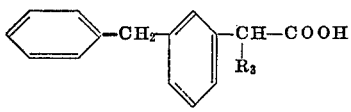

VII wherein $R_3$ is as hereinbefore defined, which is optionally optically active, by methods known per se for the oxidation of a methylene group to a carbonyl group. Preferably, this oxidation is carried out by means of potassium permanganate in alkaline medium at 20° C.

The (3-benzylphenyl)alkanoic acids of Formula VII can be obtained by desulphuration of a heterocyclic compound of the general formula:

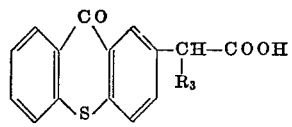

VIII wherein $R_3$ is as hereinbefore defined, which is optionally optically active, by methods known per se. Preferably this desulphuration is effected by heating in the presence of Raney nickel in an organic solvent such as ethanol.

Optically active compounds of Formula VIII can be obtained by resolution of a racemic product of Formula VIII by formation of an optically active salt and successive crystallisations. This resolution is generally carried out by means of D-α-phenylethylamine or L-α-phenylethylamine, depending upon the isomer which it is desired to obtain.

The compounds of Formula VIII can be obtained by the cyclisation of a diphenylsulphide of the general formula:

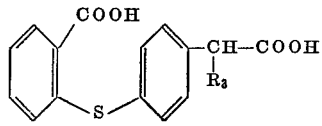

IX wherein $R_3$ is as hereinbefore defined, by means of polyphosphoric acid by heating at a temperature between 80° and 120° C.

The diphenylsulphides of Formula IX can be obtained by reacting 2-iodobenzoic acid with an acid of the general formula:

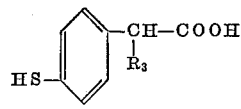

X wherein $R_3$ is as hereinbefore defined, the presence of an alkaline condensing agent and copper powder as catalyst.

The phenylalkanoic acids of Formula X can be obtained by the action of potassium ethylxanthate on a diazonium salt of an amine of the general formula:

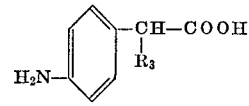

XI wherein $R_3$ is as hereinbefore defined.

The amines of the general Formula XI can be obtained by the method described by F. Nerdel and L. Fischer, Ber. 87, 217 (1954).

The (3-benzoylphenyl)alkanoic acids of general Formula I can be converted into metal salts or addition salts with nitrogenous bases by application of methods known per se. Thus, these salts can be prepared by the action of an alkali metal (for example, sodium, potassium or lithium) or alkaline earth metal base, ammonia or amine, on the acid of Formula I in an appropriate solvent such as an alcohol, an ether, a ketone or water; the salt formed is precipitated, if necessary after concentration of the solution, and is separated by filtration or decantation.

In this specification and accompanying claims the term "methods known per se" means methods heretofore used or described in the chemical literature.

The new (3-benzoylphenyl)alkanoic acids of Formula I and their salts possess useful pharmacodynamic properties; they are particularly useful as anti-inflammatory agents. When orally administered, they have exhibited an anti-inflammatory activity in doses between 2.5 and 50 mg./kg. in the guinea pig and in doses between 0.5 and 15 mg./kg. in the rat. When intravenously administered, they have exhibited an antibradykinin activity in the guinea pig in doses between 0.015 and 1 mg./kg.

For therapeutic use, the (3-benzoylphenyl)alkanoic acids of general Formula I are employed as such or in the form of pharmaceutically-acceptable salts, i.e. salts which are non-toxic in the animal organism in therapeutic doses of the salts, such as alkali metal, alkaline earth metal, ammonium and amine salts.

The following examples illustrate the invention.

EXAMPLE I

A mixture of (3-benzoylphenyl)acetonitrile (30 g.), concentrated sulphuric acid (60 cc.) and water (60 cc.) is heated under reflux under nitrogen for 30 minutes. Water (180 cc.) is added, and a product crystallises, which is separated by filtration and washed with water (100 cc.). There are obtained 24 g. of a product which is dissolved in diethyl ether (150 cc.). The ethereal solution is extracted with N sodium hydroxide (200 cc.) and the alkaline solution is treated with decolourising charcoal (1 g.) and then acidified with concentrated hydrochloric acid (25 cc.). An oil separates out, which is extracted with methylene chloride (450 cc.), washed with water (100 cc.) and dried over anhydrous sodium sulphate. The product is concentrated to dryness under reduced pressure (20 mm. Hg) to give a white crystalline residue (18 g.), M.P. 114–115° C., which is recrystallised from a mixture of benzene (120 cc.) and petroleum ether (130 cc.) to yield 3-benzoylphenylacetic acid (17.3 g.), M.P. 114–115° C.

(3-benzoylphenyl)acetonitrile employed as starting material is prepared as follows:

3-bromomethylbenzophenone (160 g.) is dissolved in dioxan (300 cc.), and a solution of sodium cyanide (125 g.) in water (300 cc.) is added. The mixture is heated under reflux for 3 hours, and then treated with decolourising charcoal (10 g.) and extracted with methylene chloride (800 cc.). The methylene chloride solution is dried over anhydrous sodium sulphate and concentrated to dryness under reduced pressure (20 mm. Hg) to give a brown oil (119 g.), which is dissolved in methylene chloride (300 cc.) and chromatographed through alumina (450 g.). Elution is effected with methylene chloride and there is collected a fraction of 4 litres, which is concentrated to dryness under reduced pressure (20 mm. Hg) to yield (3-benzoylphenyl)acetonitrile (109 g.) in the form of an oil.

3-bromomethylbenzophenone is prepared as follows:

3-methylbenzophenone (98 g.) is dissolved in ethylene bromide (200 cc.), the solution is heated under reflux, and a solution of bromine (79 g.) in ethylene bromide (60 cc.) is added over a period of 3 hours in the presence of ultraviolet light. Heating under reflux is continued for 30 minutes, and the product is concentrated to dryness under reduced pressure (20 mm. Hg) to give 3-bromomethylbenzophenone in the form of an oil in quantitative yield.

3-methylbenzophenone is prepared in accordance with E. Ador and A. A. Rilliet, Ber., 12, 2298 (1879).

EXAMPLE II

A mixture of ethyl methyl(3-benzoylphenyl)cyanoacetate (48 g.), concentrated sulphuric acid (125 cc.) and water (125 cc.) is heated under reflux under nitrogen for 4 hours, and water (180 cc.) is then added. The reaction mixture is extracted with diethyl ether (300 cc.) and the ethereal solution is extracted with N sodium hydroxide (300 cc.). The alkaline solution is treated with decolourising charcoal (2 g.) and then acidified with concentrated hydrochloric acid (40 cc.). An oil separates out, which is extracted with methylene chloride (450 cc.), washed with water (100 cc.) and dried over anhydrous sodium sulphate. The product is concentrated to dryness under reduced pressure (20 mm. Hg) to give a brown oil (33.8 g.).

This oil is dissolved in benzene (100 cc.) and chromatographed through silica (430 g.). After elution with ethyl acetate, there is collected a fraction of 21 litres, which is concentrated to dryness under reduced pressure (20 mm. Hg). The crystalline residue (32.5 g.) is recrystallised from acetonitrile (100 cc.) and a product (16.4 g.), M.P. 94° C., is obtained. On recrystallisation from a mixture of benzene (60 cc.) and petroleum ether (200 cc.), there is finally obtained 2-(3-benzoylphenyl)propionic acid (13.5 g.), M.P. 94° C.

Ethyl methyl(3-benzoylphenyl)cyanoacetate employed as starting material is prepared as follows:

The sodium derivative of ethyl (3-benzoylphenyl)cyanoacetate (131 g.) is dissolved in anhydrous ethanol (2 litres). Methyl iodide (236 g.) is added and the mixture is heated under reflux for 22 hours, and then concentrated to dryness under reduced pressure (10 mm. Hg). The residue is taken up in methylene chloride (900 cc.) and water (500 cc.) and acidified with 4 N hydrochloric acid (10 cc.). The methylene chloride solution is decanted, washed with water (400 cc.) and dried over anhydrous sodium sulphate. The methylene chloride solution is filtered through a column containing alumina (1500 g.). Elution is effected with methylene chloride (6 litres), and the solvent is evaporated under reduced pressure (10 mm. Hg) to give ethyl methyl(3-benzoylphenyl)cycanoacetate (48 g.) in the form of an oil.

The sodium derivative of ethyl (3-benzoylphenyl)cyanoacetate is prepared as follows:

(3-benzoylphenyl)acetonitrile (170 g.) is dissolved in ethyl carbonate (900 g.). There is added, over a period of 2 hours, a sodium ethoxide solution [prepared from sodium (17.7 g.) and anhydrous ethanol (400 cc.)], the reaction mixture being heated at about 105–115° C. and ethanol being continuously distilled. A product precipitates. Toluene (500 cc.) is added, and then, after distillation of 50 cc. of toluene, the product is allowed to cool. Diethyl ether (600 cc.) is added and the mixture is stirred for one hour. The crystals which form are filtered off and washed with diethyl ether (600 cc.) to give the sodium derivative of ethyl (3-benzoylphenyl)cyanoacetate (131 g.).

EXAMPLE III

A mixture of 3 - cyanomethyl - 4' - methylthiobenzophenone (20 g.), concentrated sulphuric acid (50 cc.) and water (50 cc.) is heated under reflux for 1 hour 30 minute,s and water (100 cc.) and diethyl ether (300 cc.) are then added. The ethereal solution is extracted with 4 N sodium hydroxide (200 cc.), and the alkaline solution is treated with declourising charcoal (2 g.) and then acidified with 12 N hydrochloric acid (80 cc.). An oil separates out, which is extracted with methylene chloride (300 cc.), washed with water (100 cc.) and dried over anhydrous sodium sulphate. The product is concentrated to dryness under reduced pressure (20 mm. Hg) to give a brown oil (6.1 g.). After distillation under reduced pressure (B.P. 220° C./0.5 mm. Hg), there is obtained a product (3.5 g.) melting at 143° C.

In the same way 8 g. of this product are prepared.

The two lots are recrystallised from benzene (50 cc.) to yield finally 3-(4-methylthiobenzoyl)phenylacetic acid (8.3 g.), M.P. 144° C.

By the procedure described in Example I for the preparation of (3-benzoylphenyl)acetonitrile and 3-bromomethylbenzophenone, there are successively prepared:

3-cyanomethyl-4'-methylthiobenzophenone (183 g.), in the form of an oil, by the action of sodium cyanide (208 g.) on 3-bromomethyl-4'-methylthiobenzophenone (278 g.) in dioxan (600 cc.) by heating under reflux for 3 hours;

3-bromomethyl-4'-methylthiobenzophenone in the form of an oil, in a substantially quantitative yield, by the action of bromine (138 g.) on 3-methyl-4'-methylthiobenzophenone (210 g.) in ethylene bromide (630 cc.) by heating under reflux and in the presence of ultraviolet light.

3 - methyl - 4' - methylthiobenzophenone employed as starting material is prepared as follows:

A mixture of metatoluic acid (272 g.), thioanisole (248 g.) and polyphosphoric acid (2100 g.) is heated between 80° and 90° C. with stirring for 3 hours, allowed to cool, and water (1.5 litres) is then added. The product is extracted with diethyl ether (1.7 litres) and the ethereal solution is washed with 2 N sodium hydroxide (900 cc.) and then with water (500 cc.) and dried over anhydrous sodium sulphate. On concentration to dryness under reduced pressure (20 mm. Hg), there is obtained a yellow crystalline product (491 g.), which is purified by distillation under reduced pressure (0.1 mm. Hg) to yield 3-methyl-4'-methylthiobenzophenone (428 g.) distilling at 182–184° C.

EXAMPLE IV

L-2-(3-benzylphenyl)propionic acid (10 g.) is dissolved in N sodium hydroxide (200 cc.), and a solution of potassium permanganate (26 g.) in water (800 cc.) is added. After stirring for 16 hours at 20° C., the reaction mixture is acidified with concentrated sulphuric acid (40 cc.), and then a sodium bisulphite solution ($d$=1.24: 80 cc.) is added. The mixture is extracted with methylene chloride (800 cc.), and the methylene chloride solution is washed with water (200 cc.) and dried over anhydrous sodium sulphate. Concentration to dryness under reduced pressure (20 mm. Hg) gives a yellow oil (10 g.).

This oil is dissolved in diethyl ether (300 cc.) and the ethereal solution is extracted with N sodium hydroxide (200 cc.). The aqueous solution is acidified with 12 N hydrochloric acid (20 cc.). An oil separates out, which is extracted with methylene chloride (300 cc.) and dried over anhydrous sodium sulphate. After concentration to dryness under reduced pressure (20 mm. Hg), there is obtained a yellow oil (5.8 g.), which is purified by crystallisation from a mixture of diisopropyl ether (17 cc.)

and petroleum ether (B.P. 40–65° C.; 15 cc.) to yield L-2-(3-benzoylphenyl)propionic acid (3 g.), M.P. 72° C.;

$$[\alpha]_D^{19} = +42° \pm 1°;\ [\alpha]_{436}^{19} = +90° \pm 1.5°$$

L-2-(3-benzylphenyl)propionic acid is prepared as follows:

L-2-(2-thiaxanthonyl)propionic acid (17.1 g.) is dissolved in ethanol (1 litre), Raney nickel (200 g.) is added and the mixture is heated under reflux for two hours. The nickel is filtered off and washed with ethanol (250 cc.).

The ethanolic solution is concentrated to dryness under reduced pressure (20 mm. Hg) to give a yellow oil (5.5 g.), which is taken up in water (200 cc.) and 4 N hydrochloric acid (100 cc.), extracted with methylene chloride (400 cc.) and dried over anhydrous sodium sulphate. Concentration to dryness under reduced pressure (20 mm. Hg) yields L-2-(3-benzylphenyl)proponic acid (4.8 g.) in the form of an oil.

The nickel is dissolved in water (1 litre) and 12 N hydrochloric acid (250 cc.), and methylene chloride (1.8 litres), and the methylene chloride solution is filtered in the presence of a filtration aid, decanted and washed with water (600 cc.). The organic layer is dried over sodium sulphate and concentrated to dryness under reduced pressure (20 mm. Hg) to give L-2-(3-benzylphenyl)propionic acid (5.8 g.).

The two combined lots are employed in the crude form.

$$[\alpha]_D^{20} = +50° \pm 1°;\ [\alpha]_{436}^{20} = +108° \pm 1.2°$$

L-2-(2-thiaxanthonyl)propionic acid is prepared as follows:

L-phenylethylamine (66.5 g.) is added to a suspension of racemic 2-(2-thiaxanthonyl)propionic acid (155.6 g.) in methanol (1.5 litres). Dissolution occurs, and the solution is treated with decolourising charcoal (2 g.) and concentrated to dryness under reduced pressure (20 mm. Hg) to give a crystalline residue (221 g.).

The product is recrystallised four times from methanol (800 cc., 650 cc., 480 cc. and 380 cc.) to yield 89.8 g., 51.8 g., 31.6 g. and 24.4 g. respectively of a crystalline product.

The rotatory powers of the 2-(2-thiaxanthonyl)propionic acids corresponding to these crystalline fractions are respectively $[\alpha]_D^{20} = -43.1°, -54.9°, -72°$ and $-75° \pm 1.5°$. There is thus obtained the L-phenylethylamine salt of D 2-(2-thiaxanthonyl)propionic acid (24.4 g.).

This salt (29.1 g.) is stirred with distilled water (500 cc.), 12 N hydrochloric acid (50 cc.) and ethyl acetate (2 litres). Dissolution occurs, and the organic layer is separated, washed with distilled water (400 cc.), dried over anhydrous sodium sulphate and concentrated to dryness under reduced pressure (20 mm. Hg) to give D-2-(2-thiaxanthonyl)propionic acid (20.6 g.), M.P. 192° C.;

$$[\alpha]_D^{19.5} = -73° \pm 1.5°$$

The mother liquors resulting from the crystallisation from methanol are concentrated to dryness under reduced pressure (20 mm. Hg) to give a product (206.1 g.), which is dissolved in water (4 litres), ethyl acetate (8 litres) and 12 N hydrochloric acid (200 cc.). The aqueous phase is decanted and the organic phase is dried over anhydrous sodium sulphate and concentrated under reduced pressure (20 mm. Hg) to a volume of 500 cc. The crystals which appear are filtered off and washer with ethyl acetate (200 cc.) to yield 2-(2-thiaxanthonyl)propionic acid (110.1 g.) enriched with L-isomer.

D-phenylethylamine (47 g.) is added to a suspension of the enriched acid (110.1 g.) in methanol (1 litre). Dissolution occurs, and the solution is treated with decolouring charcoal (2 g.) and concentrated to dryness under reduced pressure (20 mm. Hg).

The product obtained is recrystallised three times from methanol (700 cc., 400 cc. and 400 cc.) to yield 52.5 g., 31.1 g. and 24.7 g. respectively of a crystalline product. The rotatory powers of the 2-(2-thiaxanthonyl)propionic acids corresponding to the crystalline fractions are respectively $[\alpha]_D^{20} = +52°, +64°$ and $+71° \pm 1.5°$. There is thus obtained the D-phenylethylamine salt of L-2-(2-thiaxanthonyl)propionic acid (24.7 g.).

This salt (24.4 g.) is stirred with water (200 cc.), 12 N hydrochloric acid (30 cc.) and ethyl acetate (1.5 litres). Dissolution occurs, and the organic layer is separated and dried over anhydrous sodium sulphate and concentrated to dryness under reduced pressure (20 mm. Hg) to yield L-2-(2-thiaxanthonyl)propionic acid (17.1 g.), M.P. 192° C., $[\alpha]_D^{20} = +71° \pm 1.5°$.

2-(2-thiaxanthonyl)propionic acid is prepared as follows:

A mixture of 2-[4-(2-carboxyphenylthio)phenyl]propionic acid (221 g.) and polyphosphoric acid (2 kg.) is heated for 4 hours at 100° C., allowed to cool and poured, with stirring, into water (5 litres) and ice (2 kg.). The mixture is extracted with ethyl acetate (8 litres), dried over anhydrous sodium sulphate, treated with decolourising charcoal (15 g.) and concentrated under reduced pressure (20 mm. Hg) to a volume of about 1 litre. A product precipitates. The crystals are filtered off and washed with ethyl acetate (120 cc.) to give 2-(2-thiaxanthonyl)propionic acid (155 g.), M.P. 191° C.

2-[4-(2 - carboxyphenylthio)phenyl]propionic acid is prepared as follows:

A mixture of 2 - (4-mercaptophenyl)propionic acid (156 g.), 2-iodobenzoic acid (213 g.), copper powder (2 g.), a 2.2 N ethanolic solution of potassium ethoxide (1175 cc.) and ethanol (1.5 litres) is heated under reflux for 3 hours 30 minutes and concentrated to dryness under reduced pressure (20 mm. Hg), and the residue is taken up in distilled water (2 litres), treated with decolouring charcoal (20 g.), filtered and acidified with 12 N hydrochloric acid (350 cc.). The product is extracted with ethyl acetate (2 litres), dried over anhydrous sodium sulphate and concentrated to dryness under reduced pressure (20 mm. Hg) to yield a crystalline residue (350 g.). This residue is purified by recrystallisation from a mixture of acetonitrile (600 cc.) and acetic acid (600 cc.) to give 2-[4-(2-carboxyphenylthio)phenyl]propionic acid (130 g.), M.P. 191° C.

The mother liquors are concentrated to dryness and there is obtained a crystalline residue, which is recrystallised from acetonitrile (400 cc.) to give 2-[4-(2-carboxyphenylthio)phenyl]propionic acid (44.9 g.), M.P. 190° C.

2-(4-mercaptophenyl)propionic acid is prepared as follows:

2-(4-aminophenyl)propionic acid (122 g.) is dissolved in 12 N hydrochloric acid (130 cc.) and water (400 cc.) and cooled to 0° C., and a solution of sodium nitrite (55 g.) in water (200 cc.) is added over a period of 20 minutes. The solution of the diazonium salt obtained is maintained at 0° C.

Potassium ethylxanthate (128 g.) is dissolved in water (500 cc.) and ethyl acetate (600 cc.) is added. The mixture is heated to 55° C. and the solution of the diazonium salt is added over a period of one hour. After cooling, the ethyl acetate is separated and the aqueous solution is again extracted with ethyl acetate (1 litre), washed with water (500 cc.), dried over anhydrous sodium sulphate and concentrated to dryness under reduced pressure (20 mm. Hg) to yield a red oil (180 g.).

This oil is dissolved in ethanol (1 litre), potassium hydroxide (152 g.) in solution in water (500 cc.) is added, and the mixture is heated under reflux for one hour and concentrated to dryness under reduced pressure (20 mm. Hg). The residue is taken up in water (500 cc.) and treated with decolourising charcoal (5 g.). 12 N hydrochloric acid (200 cc.) is added, and an oil separates out, which is extracted with methylene chloride (700 cc.), dried over anhydrous sodium sulphate and concentrated to dryness under reduced pressure (20 mm. Hg). A brown oil (95 g.) is obtained, which is purified by distillation under reduced pressure to give 2-(4-mercaptophenyl)propionic acid (45.3 g.), B.P. 160° C./3.5 mm. Hg.

2-(4-aminophenyl)propionic acid is prepared in accordance with F. Nerdel and L. Fischer, Ber., 87, 217 (1954).

EXAMPLE V

By the procedure of Example IV but starting with DL-2-(3-benzylphenyl)propionic acid (1.75 g.) in solution in 0.1 N sodium hydroxide (34.5 cc.) and distilled water (15 cc.), and with potassium permanganate (4.62 g.) in solution in distilled water (50 cc.), there is obtained DL-2 - (3 - benzoylphenyl)propionic acid (0.73 g.), M.P. 86° C.

DL-2-(3-benzylphenyl)propionic acid (3.3 g.), in the form of an oil, is obtained by the action of Raney nickel (46 g.) on DL-2-(2-thiaxanthonyl)propionic acid (4.6 g.) in 0.1 N sodium hydroxide (178 cc.) by heating under reflux for 6 hours.

EXAMPLE VI

A mixture of (3-benzoyl-2-methoxyphenyl)acetonitrile (198 g.), concentrated sulphuric acid (600 cc.) and water (600 cc.) is heated under reflux for one hour. Water (1.5 litres) is then added and the reaction mixture extracted with diethyl ether (2 litres). The ethereal solution is extracted with 4 N sodium hydroxide (1.5 litres), and the alkaline solution is treated with decolourising charcoal (50 g.) and acidified with 11 N hydrochloric acid. The oil which separates is extracted with methylene chloride (2 litres), dried over anhydrous sodium sulphate and concentrated to dryness under reduced pressure (20 mm. Hg) to give a yellow oil (107 g.), which is a mixture of 3-benzoyl-2-hydroxyphenylacetic and 3-benzoyl - 2 - methoxyphenylacetic acids.

This mixture (20 g.) is heated under reflux for 2 hours with 48% aqueous hydrobromic acid (200 cc.) in acetic acid (200 cc.). The reaction mixture is evaporated to dryness under reduced pressure (20 mm. Hg) and water (300 cc.) is added. A product crystallises, which is separated by filtration and washed with water (300 cc.) to give a product (17 g.) which is recrystallised from benzene (110 cc.). There is thus obtained 3-benzoyl-2-hydroxyphenylacetic acid (13.5 g.) melting at 154° C.

(3-benzoyl-2-methoxyphenyl)acetonitrile is prepared as follows:

3-bromomethyl-2-methoxybenzophenone (509 g.) is dissolved in dioxan (1 litre), and a solution of sodium cyanide (246 g.) in water (1 litre) is added. The reaction mixture is heated under reflux for 2 hours 30 minutes and then extracted with diethyl ether (2.5 litres). The ethereal solution is dried over anhydrous sodium sulphate, concentrated to dryness under reduced pressure (20 mm. Hg) to give a brown oil (410 g.). Purification is effected by distillation under reduced pressure to yield (3-benzoyl-2-methoxyphenyl)acetonitrile (198 g.), B.P. 197° C./0.5 mm. Hg.

3-bromomethyl-2-methoxybenzophenone is prepared in the following manner:

2-methoxy-3-methylbenzophenone (377 g.) is dissolved in ethylene bromide (1 litre). The solution is heated under reflux and, over a period of 1 hour and 15 minutes and in the presence of ultra-violet light, bromine (267 g.) is added. Heating under reflux is continued for another 30 minutes, and then the reaction mixture is concentrated to dryness under reduced pressure (20 mm. Hg) to give, in quantitative yield, 3-bromomethyl-2-methoxybenzophenone, which is used in crude form.

2-methoxy-3-methylbenzophenone is prepared according to H. Richtzenhain and P. Nippus, Ber., 82, 408, (1949).

The present invention includes within its scope pharmaceutical compositions containing, as active ingredient, at least one of the (3-benzoylphenyl)alkanoic acids of Formula I, or pharmaceutically-acceptable salt thereof, in association with a pharmaceutical carrier or coating. The invention includes especially such preparations made up for oral, parenteral or rectal administration, or topical application, e.g. as ointments or creams.

Solid compositions for oral administration include tablets, pills, powders, and granules. In such solid compositions the active compound is admixed with at least one inert diluent such as sucrose, lactose or starch. The compositions may also comprise, as is normal practice, additional substances other than inert diluents, e.g. lubricating agents, such as magnesium stearate. Liquid compositions for oral administration include pharmaceutically-acceptable emulsions, solutions, suspensions, syrups and elixirs containing inert diluents commonly used in the art, such as water and liquid paraffin. Besides inert diluents such compositions may also comprise adjuvants, such as wetting, emulsifying and suspending agents, and sweetening, flavouring and aromatizing agents. The compositions according to the invention, for oral administration, also include capsules of absorbable material such as gelatin containing the active substance with or without the addition of diluents or excipients.

Preparations according to the invention for parenteral administration include sterile aqueous or non-aqueous solutions, suspensions, or emulsions. Examples of non-aqueous solvents or vehicles are propylene glycol, polyethylene glycol, vegetable oils, such as olive oil, and injectable organic esters such as ethyl oleate. The compositions may also contain adjuvants such as wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

Compositions for rectal administration are suppositories which contain, in addition to the active substance, excipients such as cacao butter or a suppository wax.

The percentage of active ingredient in the compositions of the invention may be varied, it being necessary that it should constitute a proportion such that a suitable dosage shall be obtained. The dosage depends on the desired therapeutic effect, on the route of administration and on the duration of the treatment. In human therapy the compositions should be administered so as to give between 100 and 1,500 mg. of active substance per day.

The following examples illustrate pharmaceutical compositions according to the invention.

EXAMPLE VII

Tablets weighing 500 mg. and having the following composition are prepared:

| | Mg. |
|---|---|
| 3-benzoylphenylacetic acid | 250 |
| Starch | 190 |
| Colloidal silica | 50 |
| Magnesium stearate | 10 |

EXAMPLE VIII

Tablets weighing 200 mg. and having the following composition are prepared:

| | Mg. |
|---|---|
| 3-benzoylphenylacetic acid | 50 |
| Starch | 120 |
| Colloidal silica | 27 |
| Magnesium stearate | 3 |

We claim:
1. (3-benzoylphenyl)alkanoic acids of the formula:

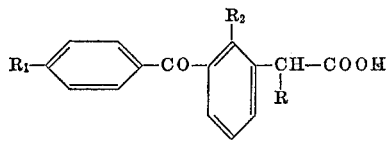

wherein R is hydrogen or alkyl of 1 through 4 carbon atoms, $R_1$ is hydrogen or alkylthio of 1 through 4 carbon atoms, $R_2$ is hydrogen or hydroxy, pharmaceutically acceptable non-toxic salts thereof.

2. The (3-benzoylphenyl)alkanoic acids according to claim 1 wherein $R_2$ is hydrogen, and pharmaceutically acceptable non-toxic salts thereof.

3. The (3-benzoylphenyl)alkanoic acid of the formula specified in claim 1 which is 3-benzoylphenylacetic acid, and pharmaceutically acceptable non-toxic salts thereof.

4. The (3-benzoylphenyl)alkanoic acid of the formula specification in claim 1 which is DL-2-(3-benzoylphenyl)-propionic acid, and pharmaceutically acceptable non-toxic salts thereof.

5. The (3-benzoylphenyl)alkanoic acid of the formula specified in claim 1 which is L-2-(3-benzoylphenyl)propionic acid, and pharmaceutically acceptable non-toxic salts thereof.

6. The (3-benzoylphenyl)alkanoic acid of the formula specified in claim 1 which is 3-(4-methylthiobenzoyl) phenylacetic acid, and pharmaceutically acceptable non-toxic salts thereof.

7. The (3-benzoylphenyl)alkanoic acid of the formula specified in claim 1 which is 3-benzoyl-2-hydroxyphenylacetic acid, and pharmaceutically acceptable non-toxic salts thereof.

References Cited

Burger. Medicinal Chemistry (1963) p. 77. RS403B8.
Chem. Abstracts vol. 64 (1963) p. 3810g–3811d.
Work. J. Org. Chem. vol. 29, p. 722–4 (1964).
Zderic. J. Org. Chem. vol. 26 p. 1635–6 (1961).
Nizamuddin. J. Indian Chem. Soc. vol. 42 (1965) p. 569–570.

LORRAINE A. WEINBERGER, Primary Examiner

E. J. GLEIMAN, Assistant Examiner

U.S. Cl. X.R.

260—328, 465 R, 465 D, 515 R, 517, 518 R, 591; 424—317

PO-1050
(5/69)

UNITED STATES PATENT OFFICE
CERTIFICATE OF CORRECTION

Patent No. 3,641,127              Dated     February 8, 1972

Inventor(s) DANIEL FARGE et al

It is certified that error appears in the above-identified patent and that said Letters Patent are hereby corrected as shown below:

In the heading, after "France, Jan. 27, 1967, 92,828" insert -- and France, December 15, 1967, 132,526 --.

Signed and sealed this 5th day of September 1972.

(SEAL)
Attest:

EDWARD M. FLETCHER, JR.
Attesting Officer

ROBERT GOTTSCHALK
Commissioner of Patents

UNITED STATES PATENT AND TRADEMARK OFFICE

CERTIFICATE EXTENDING PATENT TERM
UNDER 35 U.S.C. 156

Patent No.    : 3,641,127

Dated         : February 8, 1972

Inventor(s)   : Daniel Farge, et al

Patent Owner  : Rhone-Poulenc S.A.

This is to certify that there has been presented to the

COMMISSIONER OF PATENTS AND TRADEMARKS an application under 35 U.S.C. 156 for an extension of the patent term. Since it appears that the requirements of law have been met, this certificate extends the term of the patent for the period of

2 YEARS with all rights pertaining thereto as provided by 35 USC 156(b).

I have caused the seal of the Patent and Trademark Office to be affixed this Nineteenth day of December 1986.

Donald J. Quigg

Assistant Secretary and Commissioner of Patents and Trademarks